Dec. 30, 1958      E. ALLDREDGE      2,866,381
STEREOGRAPHIC MAP READING APPARATUS
Filed Nov. 21, 1956      2 Sheets-Sheet 1
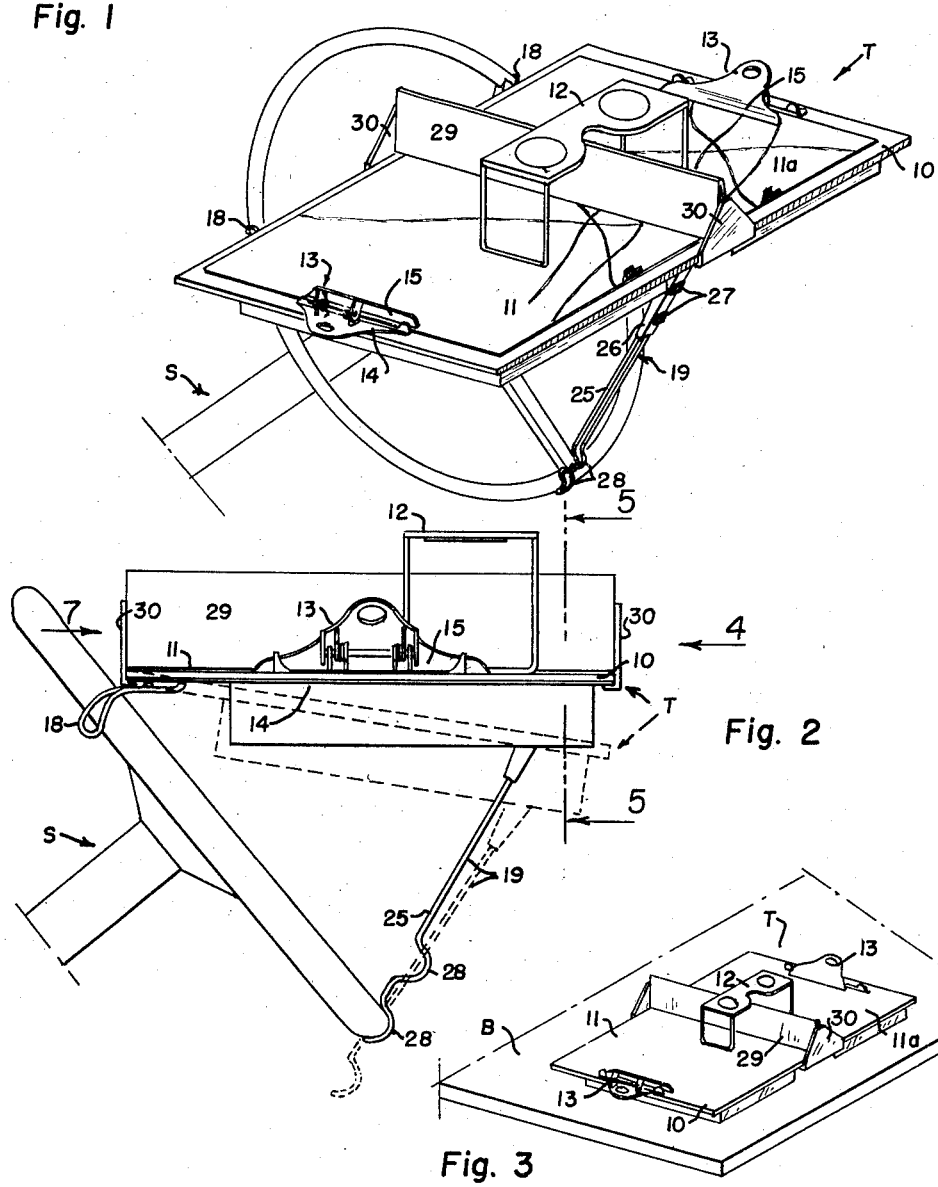
INVENTOR.
Enis Alldredge
BY WHITEHEAD, VOGL & LOWE
PER Frank C. Lowe
ATTORNEYS Dec. 30, 1958 E. ALLDREDGE 2,866,381
STEREOGRAPHIC MAP READING APPARATUS
Filed Nov. 21, 1956 2 Sheets-Sheet 2
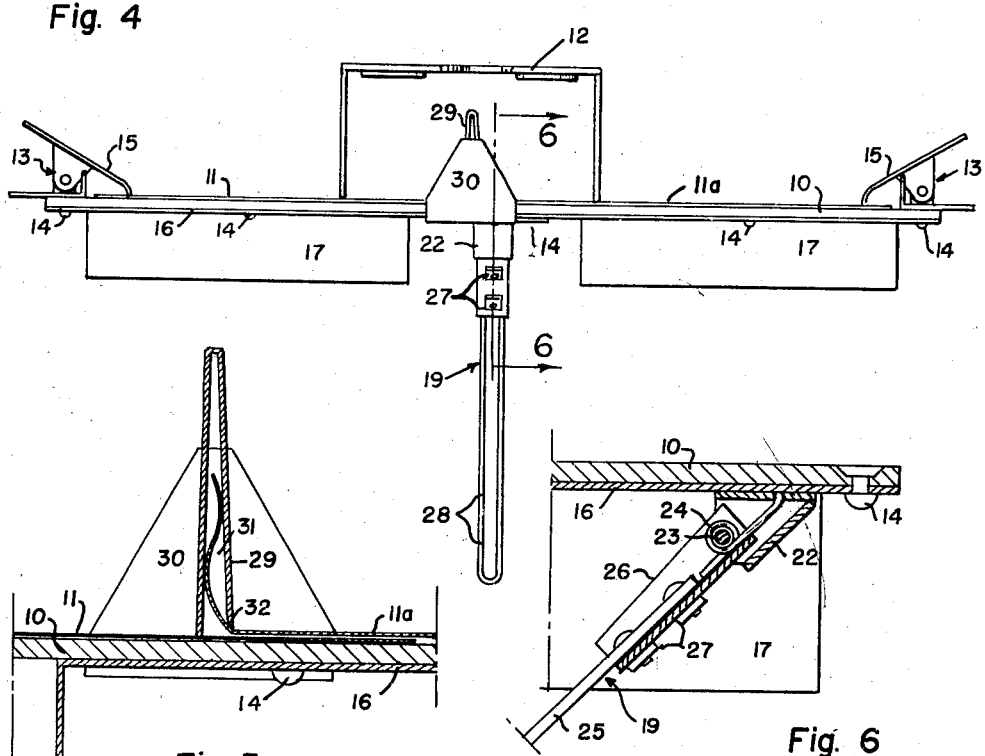
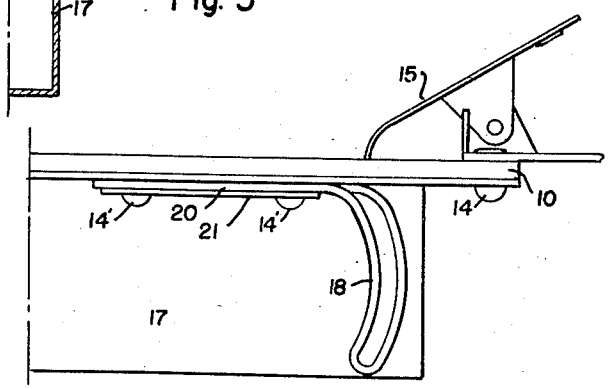
INVENTOR.
Enis Alldredge
BY WHITEHEAD, VOGL & LOWE
PER Frank C. Lowe
ATTORNEYS United States Patent Office 2,866,381
Patented Dec. 30, 1958

2,866,381

STEREOGRAPHIC MAP READING APPARATUS

Enis Alldredge, Scottsbluff, Nebr.

Application November 21, 1956, Serial No. 623,712

3 Claims. (Cl. 88—29)

This invention relates to stereographic map-reading apparatus and more particularly to tables for holding aerial photographs in position for stereographic study. A primary object of the invention is to provide a novel and improved portable table for holding aerial photographs in stereographic order, which is especially versatile in that it is adapted for both field and office use.

Other objects of the invention are to provide a novel and improved portable photo-holding table for stereographic aerial photographs which: (a) is especially suitable for field reconnaissance work in preliminary surveys, geological studies and the like when repeated reference to the stereographic aerial photographs is necessary as the surveyor or survey party moves across the countryside; (b) is especially adapted for such preliminary field reconnaissance in that it may be mounted upon the steering wheel of an automobile and the automobile then turned to orient the map to position for comparative use by a driver; (c) is adapted to properly hold a pair of stereographic aerial photographs in any selected position and includes means to quickly and easily shift the overlapping portions of a map when a conventional stereoscope lens is being shifted from one position to another; (d) is quickly and easily attached to or removed from a steering wheel of an automobile and may be as easily placed upon a conventional table or the like; and (e) is a simply constructed, low-cost, lightweight rugged and durable unit.

With the foregoing and other objects in view all of which more fully hereinafter appear, my invention comprises certain novel and improved constructions, combinations and arrangements of parts and elements as hereinafter described and as defined in the appended claims and illustrated in preferred embodiment in the accompanying drawing in which:

Figure 1 is an isometric view of my photo-holding table mounted upon the steering wheel of an automobile, illustrating a pair of maps set therein in stereographic array and stereographic viewing glasses set in position as for use.

Figure 2 is a side elevation view of the unit illustrated at Fig. 1, with broken lines indicating an alternate position of the elements on the steering wheel.

Figure 3 is an isometric diagrammatic view of the apparatus as placed upon a conventional table.

Figure 4 is a front elevation view of the apparatus per se as taken from the indicated arrow 4 at Fig. 2.

Figure 5 is a fragmentary sectional detail as taken substantially on indicated line 5—5 at Fig. 2 but on an enlarged scale.

Figure 6 is a fragmentary sectional detail as taken substantially on the indicated line 6—6 at Fig. 4 but on an enlarged scale.

Figure 7 is an enlarged fragmentary detail of a corner as viewed substantially on the indicated arrow 7 at Fig. 2.

There is a considerable amount of highway reconnaissance work, geological survey work, as well as military work where there is a need for a three dimensional map study of a terrain as a survey party moves through the terrain. Such three dimensional maps can be best obtained from stereoscopic arrangement of overlapping aerial photographs. Such photographs when properly set and properly viewed through a stereographic lens will quickly give an observer a good idea of the terrain, and when such is viewed in the field it will permit the observer to quickly compare and identify particular landmarks with respect to the location on the map.

This technique of field survey has many advantages which will make it very popular; however, there is a need for improved means which will permit a surveyor to quickly and easily set up the photographs on a table or the like for stereographic study. Conventional tables for this purpose are generally bulky and difficult to set up, and when a party is travelling through the country, as in an automobile, where frequent stops are necessary, much time may be consumed in setting up the apparatus. With such in view, the present invention was conceived and developed and comprises, in essence, a photo-holding table for holding aerial photographs in stereographic arrangement which is constructed in such a manner as to be easily and quickly attached to the steering wheel of an automobile to outstand therefrom in a horizontal or nearly horizontal position.

Referring more particularly to the drawing, my improved photo-holding table T is formed as a flat, rectangular board 10 whose proportions are such as to hold a pair of ordinary aerial photographs 11 and 11a in proper overlapping position for stereoscopic viewing of the same as with lenses 12. Such photographs are generally not larger than 11 by 11 inches square, and a satisfactory size for the board 10 is 12 inches deep by 20 inches wide although it is to be understood that such dimensions may be varied as desired.

A spring clip 13 is affixed to each end of the board 10 as by rivets 14 with the head 15 of the clip bearing against the face of the board with sufficient resilient pressure to hold a photograph or similar sheet against the board in any selected position. In aerial photography such photographs are generally taken along a selected course, and with an approximate one third overlap so that mating photographs will generally fit the board in the regular array as illustrated at Fig. 1 and only minor adjustments to the positioning of the photographs is necessary to bring the photographs in stereoscopic focus. Such minor adjustments are easily made by setting the photographs to selected positions and then holding them by the spring clips 13.

The board 10 is formed as a thin sheet of plywood, hardboard or the like and is reinforced by a metallic plate 16 affixed thereto as by rivets 14. This plate 16 is suitably formed to provide depending box-like sections 17 underneath each side of the board to impart thickness to the unit and to permit wheel mounting elements to be retracted out of the way when the apparatus is set upon a table or the like as in the manner illustrated at Fig. 3. Although such sections are illustrated as being closed at all sides, they may be partially open to provide access thereinto and used for holding various supplies.

The means for holding the board to a steering wheel S is accomplished by a pair of hooks 18R and 18L at transversely opposing corners at one side of the board and a central leg 19 at the opposite side of the board, the hooks being adapted to engage the upper portion of an inclined steering wheel S and the leg being adapted to rest upon the bottom of the wheel.

Each hook 18 is formed as a doubly bent wire having the ends turned together to lie in spaced parallelism as a flat portion 20 which lies against the underside of the board 10 and is affixed thereto as by rivets 14' which extend between the flat wire portions to hold a cap plate 21 against them. From this secured position, the hooks extend outwardly and downwardly from the board in right and left-hand partial loops that are adapted to rest upon the upper portion of a steering wheel in the manner illustrated.

The opposite central leg 19 is carried upon a bracket 22 which is riveted to the underside of the board 10. It is pivoted thereto as by a pin 23 and is adapted to resiliently swing against the underside of the board 10 between the box-like spacer sections 17 by a spring 24 about the pin 23. The leg 19 itself is formed as an extended looped wire 25 which is secured to a short channel bracket 26 at the pivot as by bolts 27. The lower opposite end of this loop is formed with notch or hook portions 28 which receive the lower edge of the steering wheel, there being a plurality of such hook portions to permit adjustments of the inclination of the board as in the manner illustrated in full and broken lines at Fig. 2.

The proper use of stereographic maps requires either a prism-type offset lens or a substantial overlapping of the photographs when simple lenses 12, as illustrated, are used. When thus used, it often becomes necessary to shift the photograph overlap to see portions that would be otherwise covered. To accomplish this, an upstanding dividing wall 29 is slidably carried in brackets 30 which overhang the opposite edges of the board 10 to secure the wall in position across the board in shiftable, sliding relationship thereon. The wall 29 is formed with a hollow interior 31 which opens from the bottom and as such may be made by a simple piece of overfolded metal or the like with the bottom portion suitably widened to permit it to receive the lapping end of the upper of the lapped photograph 11a. The lower edge about which the photograph turns is suitably curved as at 32 to prevent creasing of the photograph and to permit easy manipulation of the unit. It follows that the lenses 12 simply straddle this wall and as necessary, the wall is shifted as the lenses are shifted to view selected portions of the terrain depicted on the photographs.

The operation of this apparatus will be obvious to those skilled in the art of reading stereoscopic aerial photographs, and the obvious advantages lie in the quick and easy mounting of the table T upon a steering wheel and since the automobile may be turned to a desired direction, the photographs may be oriented directly with the terrain so that all the operator has to do is to glance ahead and compare the terrain with the photograph. The apparatus may be used with ease in an office as well as in the field.

It is obvious that others skilled in the art can devise and build other alternate and equivalent constructions which are within the scope and spirit of my invention and hence, I desire that my protection be limited, not by the constructions illustrated and described, but only by the proper scope of the appended claims.

I claim:

1. A portable stereographic map reading apparatus for use with aerial photographs and the like, and comprising, in combination, a table proportioned to hold a pair of aerial photographs in overlapping and overlapped relationship for stereographic viewing, a clip at each end of the table for so holding the photographs onto the table, and an overfolded dividing wall having an inverted pocket therein adapted to receive an end of the overlapping aerial photograph, a bracket at each end of the dividing wall slidably engaging the edges of the table between the clips and adapted to hold the dividing wall transversely across the table and permit the wall to shift along the table between the clips for exposure of selected, normally covered portions of the overlapped aerial photograph, and means for mounting the table upon the steering wheel of an automobile.

2. The apparatus defined in claim 1 wherein said mounting means include a hook at the underside of the table near each corner along one edge thereof adapted, in conjunction with the opposing hook, to embrace the upper portion of the rim of a steering wheel and a leg at the underside of the table at the center and near the opposite edge adapted to depend therefrom and rest upon the lower edge of the steering wheel rim.

3. The apparatus defined in claim 2 wherein said leg is hingedly connected to the table and includes spring means adapted to resiliently pull it against the underside of the table when in retracted position, and spacer means at the underside of the table at each side of the leg adapted to permit the table to rest upon a flat surface when the leg is retracted between said means.

References Cited in the file of this patent

UNITED STATES PATENTS

| | | |
|---|---|---|
| 1,344,498 | Fox | June 22, 1920 |
| 1,743,952 | Barr et al. | Jan. 14, 1930 |
| 2,588,416 | Sawyer | Mar. 11, 1952 |
| 2,746,821 | Schroeder | May 22, 1956 |